(12) United States Patent
Bon et al.

(10) Patent No.: US 7,520,043 B2
(45) Date of Patent: Apr. 21, 2009

(54) METHOD OF SECURING A TUBE IN A BORE THROUGH A SPHERICAL WALL, AND A DEVICE FOR DEPOSITING WELDING MATERIAL IN A FACING

(75) Inventors: Bernard Bon, Ciel (FR); Patrick Poret, Chalon sur Saone (FR)

(73) Assignee: Framatome ANP, Courbevoie (FR)

( * ) Notice: Subject to any disclaimer, the term of this patent is extended or adjusted under 35 U.S.C. 154(b) by 128 days.

(21) Appl. No.: 11/048,729

(22) Filed: Feb. 3, 2005

(65) Prior Publication Data

US 2005/0220249 A1 Oct. 6, 2005

(30) Foreign Application Priority Data

Feb. 6, 2004 (FR) .................................. 04 01187

(51) Int. Cl.
*B23P 11/00* (2006.01)
*B23K 31/02* (2006.01)
(52) U.S. Cl. .................. 29/525.14; 29/527.1; 29/527.2; 29/557; 29/558; 29/402.13; 29/402.18; 219/61; 219/61.4; 219/61.5; 219/121.14; 219/124.31; 228/102; 228/119; 376/260
(58) Field of Classification Search ............... 29/525.14, 29/527.1, 527.2, 527.4, 557, 558, 402.13, 29/402.18; 219/61.4, 61, 61.5, 124.22, 124.31, 219/121.13, 121.14; 228/102, 119; 376/260
See application file for complete search history.

(56) References Cited

U.S. PATENT DOCUMENTS

| | | | | |
|---|---|---|---|---|
| 4,440,339 A | * | 4/1984 | Tamai et al. ................. 228/119 |
| 5,196,160 A | * | 3/1993 | Porowski .................... 376/260 |
| 5,428,198 A | * | 6/1995 | Peigney et al. ................ 219/61 |
| 5,432,828 A | * | 7/1995 | Cayment et al. ............. 376/260 |
| 5,515,589 A |   | 5/1996 | Kazirskis et al. |
| 5,516,999 A | * | 5/1996 | Fournier ................. 219/121.14 |
| 5,555,280 A | * | 9/1996 | Cartry ........................ 376/260 |
| 5,661,767 A | * | 8/1997 | Roux .......................... 376/260 |
| 5,674,419 A | * | 10/1997 | Koide et al. ......... 219/137 WM |

(Continued)

FOREIGN PATENT DOCUMENTS

DE 128 462 A 11/1977

(Continued)

*Primary Examiner*—Essama Omgba
(74) *Attorney, Agent, or Firm*—Connolly Bove Lodge & Hutz LLP

(57) ABSTRACT

An annular facing is machined in an inside surface of the spherical wall around the periphery of a zone where the wall has a bore for securing the tube passing therethrough. A first welding material is deposited in the facing, and the bore is made by drilling through a portion of the spherical wall that is surrounded by the facing. The tube is engaged tightly in the bore, and a second welding material is deposited in the facing at the periphery of the tube in order to weld the tube to the first welding material. At least one of the operations of depositing the first and second welding materials in the facing is performed automatically by causing a welding torch to turn around the axis of the bore while moving the torch in a direction that is parallel to the axis of the bore and while causing it to pivot about an axis that is orthogonal to the axis of the bore while rotation is taking place.

4 Claims, 5 Drawing Sheets

U.S. PATENT DOCUMENTS

| | | | | |
|---|---|---|---|---|
| 5,700,988 A | * | 12/1997 | Fournier | 219/121.13 |
| 5,796,797 A | * | 8/1998 | Fallas | 376/260 |
| 5,809,098 A | * | 9/1998 | Deaver | 376/203 |
| 5,889,251 A | * | 3/1999 | Payne et al. | 219/75 |
| 5,897,793 A | * | 4/1999 | Chavez | 219/69.2 |
| 5,966,308 A | * | 10/1999 | Kazirskis et al. | 700/195 |
| 6,188,741 B1 | * | 2/2001 | Ballas et al. | 376/203 |
| 6,380,514 B1 | * | 4/2002 | Han | 219/125.1 |
| 6,834,092 B2 | * | 12/2004 | Willis et al. | 376/260 |

FOREIGN PATENT DOCUMENTS

| | | |
|---|---|---|
| EP | 0 609 108 A | 8/1994 |
| EP | 0 707 318 A | 4/1996 |
| JP | 2001 018066 | 1/2001 |

* cited by examiner

METHOD OF SECURING A TUBE IN A BORE THROUGH A SPHERICAL WALL, AND A DEVICE FOR DEPOSITING WELDING MATERIAL IN A FACING

FIELD OF THE INVENTION

The invention relates to a method of securing a tube of substantially cylindrical shape in a bore passing through a spherical wall, and to a device for depositing welding material in a facing. In particular, the invention relates to a method of securing an adapter in the vessel head of a pressurized water nuclear reactor.

BACKGROUND OF THE INVENTION

Nuclear reactors cooled by pressurized water generally comprise a vessel of cylindrical shape placed, in service, with its axis vertical and having a bottom end constituted by a round bottom secured to a bottom end of the cylindrical wall of the vessel, and a top end constituting a support flange for a head which is generally of hemispherical shape and which can be secured to the vessel in a manner that is proof against the pressurized water contained in the vessel while the nuclear reactor is in operation. After the primary circuit of the nuclear reactor has been cooled and depressurized, the head can be dismounted in order to give access to the inside of the vessel which contains the core of the nuclear reactor.

In general, the reactivity of the nuclear reactor core is adjusted by means of control rods of absorbent material which are moved vertically inside the nuclear reactor core. The nuclear reactor control rods are secured to the bottom ends of drive shafts that pass through the vessel head inside tubular adapters that are of generally cylindrical shape and that have mechanisms secured thereto for moving the control rods in the vertical direction.

While the nuclear reactor is in operation, temperature measurements are taken inside its core by means of columns of thermocouples which likewise pass through the vessel head inside adapters.

The vessel head thus has a plurality of cylindrical tubular adapters passing through it, each being secured to the inside of a bore having a vertical axis (when the head is in its in-service position on the vessel), with the various adapters being distributed in a plurality of rows and in a plurality of zones of the head that are annular about the vertical axis that is common to the vessel and the head and on which the center of the spherical wall of the vessel head is situated. Depending on their positions through the vessel head, the bores through which the adapters pass (which are all parallel to the axis of the vessel head), themselves have axes at various acute angles relative to the radii of the hemispherical head passing through respective points on the axes of the bores. In particular, one of the annular rows of bores passing through the vessel head is disposed in such a manner that the axes of the bores are at an angle of about 38° relative to the corresponding radii of the hemispherical vessel head. In general, the bores have axes that do not pass through the center of the hemispherical head (with the exception of one bore that is placed on the vertical axis of the vessel), and the intersections between the bore of cylindrical shape with the outside and inside walls of the vessel head present shapes that are complex.

Each adapter passing through the vessel head presents both a top portion that projects above the vessel head, said portions having secured thereto, in particular, the mechanisms for moving the control rods, and a bottom portion that projects beneath the vessel head, which bottom portion is shorter relative to the inside surface of the head than is the corresponding top portion, and serves in particular to receive a cone for re-engaging a drive shaft.

The adapter tubes are generally made of a nickel-based alloy such as 690 alloy, and the vessel head is made of a low-alloy ferritic steel and coated on its inside surface in a layer of stainless steel. The adapter tubes must be secured in their bores passing through the head in such a manner as to be completely proof against the pressurized water that fills the vessel while the nuclear reactor is in operation (at a temperature of about 320° C. and at a pressure of about 155 bars) and they must be capable of withstanding the pressure inside the vessel.

The adapter tubes are engaged tightly in the bores passing through the vessel head and they are secured by being welded to the inside portion of the vessel head which is constituted by low-alloy steel coated in stainless steel. In each of the zones of the inside portion of the head in which a passage is made for an adapter tube, an annular facing is machined to surround the bore through which the adapter tube passes, and a welding material that is metallurgically compatible with the material of the adapter tube is deposited in the facing by welding (generally by melting a wire). Thereafter, the head is drilled to form the bore for passing the adapter, the adapter is secured tightly in the bore, and finally the adapter is welded by depositing a welding material in a portion of the facing around the adapter, in order to secure the adapter to the previously-deposited layer of welding material.

The operation of depositing a layer of welding material in the annular facing prior to drilling the bore is generally referred to by the term "buttering".

Until now, the operations of initially depositing a first welding material in the annular facing prior to drilling the bore, and of welding the adapter tube by depositing a second welding material in the remaining portion of the facing after the bore has been drilled and the adapter tube mounted therein, have been performed manually, in particular because of the complex shape of the connection surfaces between the adapters and the inside portion of the vessel head.

Such operations are lengthy and expensive and require numerous inspections, since the welding must be free from defects. The number of adapter tubes secured to a vessel head is generally large (e.g. 65 or 77 adapter tubes, depending on the type of nuclear reactor), which makes this operation extremely lengthy and expensive.

OBJECTS AND SUMMARY OF THE INVENTION

It is thus very desirable to have automatic welding methods available for performing the prior buttering and/or the welding of the adapters to the concave spherical wall of a vessel head.

More generally, it can be desirable to have automatic welding methods available for welding tubes of generally cylindrical shape to spherical walls, in particular when the tubes are secured in such a manner that their axes do not pass through the center of the spherical wall.

The object of the invention is thus to provide a method of securing a tube of substantially cylindrical shape in a bore passing through a spherical wall, the method comprising: machining an annular facing in an inside surface of the spherical wall at the periphery of a zone of the spherical wall through which the bore for securing the tube passes; depositing a first welding material in the facing; machining the welding material and making the bore by drilling through a portion of the spherical wall surrounded by the facing; engaging the tube tightly in the bore; and depositing a second welding material in the facing at the periphery of the tube in order to weld the tube to the first welding material deposited in the facing, it being possible to perform this method with reduced execution time and with very good quality.

To this end, at least one of the first and second welding materials is deposited in the facing automatically by performing the following operations:

taking an automatic welding torch having means for being continuously fed with welding material and means for melting the welding material, and causing it to turn about the axis of the bore for securing the tube; and moving the automatic welding torch in a direction parallel to the axis of the bore, and causing the welding torch to pivot about an axis orthogonal to the axis of the bore while the welding torch is being turned, so as to deposit the welding material in the facing in the form of a weld bead having characteristics that are constant.

In particular implementations taken singly or in combination:

at least one of the first and second welding materials is deposited automatically by successive passes to deposit successive weld beads extending all around the periphery of the annular facing and juxtaposed in a direction perpendicular to the axis of the bore for securing the tube by moving the welding head through a predetermined fixed distance in the direction perpendicular to the axis of the bore for securing the tube between two successive welding passes;

the following steps are performed: making the annular facing by machining, leaving a reserve of metal of the spherical wall inside the annular facing; drilling an opening in the reserve of metal inside the facing along the axis of the bore for securing the tube; securing a shaft in the opening on the axis of the bore; mounting a rotary welding head of an automatic welding installation on the shaft in order to set it into rotation about the axis of the bore; and automatically depositing a first welding material in the annular facing by setting the welding head of the automatic welding device into rotation about the axis of the bore on the shaft;

after the tube has been tightly engaged in the bore passing through the spherical wall, a shaft of an automatic welding device having a welding head mounted rotatably on the shaft is secured inside the tube on the axis of the tube, and the tube is welded automatically to the spherical wall by causing the welding head to turn about the axis on the shaft that is secured in the tube; and in order to deposit at least one of the first and second welding materials automatically in the facing, the current fed to the welding torch and the feed rate of a welding material to the welding torch are controlled while the welding torch is rotating about the axis of the bore.

The invention also provides a device for depositing a welding material in an annular facing machined in a spherical wall about a zone where a bore passes through the spherical wall in order to secure a cylindrical tube to the spherical wall, the device comprising a shaft having means for securing it to the wall on the axis of the bore for securing the tube, a welding head mounted on the shaft to rotate about the axis of the bore and including rotary drive motor means, a second motor-driven carriage carried by the welding head and movable in a direction parallel to the axis of the bore for securing the tube, a welding torch pivotally mounted about an axis orthogonal to the axis of the bore for securing the tube, and a motor-driven device for tilting the welding torch by pivoting it about the pivot axis on the second carriage, and control means for controlling the displacements of the second carriage and of the tilt device in order to keep the position of the welding torch constant in angle of tilt and in distance relative to the facing of the spherical wall.

In particular embodiments, taken in isolation or in combination:

the device further comprises a first motor-driven carriage mounted to move on the welding head in a direction perpendicular to the axis of the shaft of the welding head on which the second motor-driven carriage is mounted to move in the direction parallel oh the axis of the shaft;

the shaft of the automatic welding device is made in such a manner as to be capable of being secured in an opening machined by drilling into the spherical wall from the central portion of a reserve of metal inside the facing along the direction of the axis of the bore for securing the tube in order to deposit the first welding material automatically in the facing; and the device includes means for securing the shaft of the automatic welding device on the axis inside the bore of the tube in order to weld the tube automatically to the spherical wall.

BRIEF DESCRIPTION OF THE DRAWINGS

In order to make the invention well understood, there follows a description given by way of example with reference to the accompanying figures of an automatic method in accordance with the invention for securing an adapter in the vessel head of a nuclear reactor.

MORE DETAILED DESCRIPTION

Figure 1:
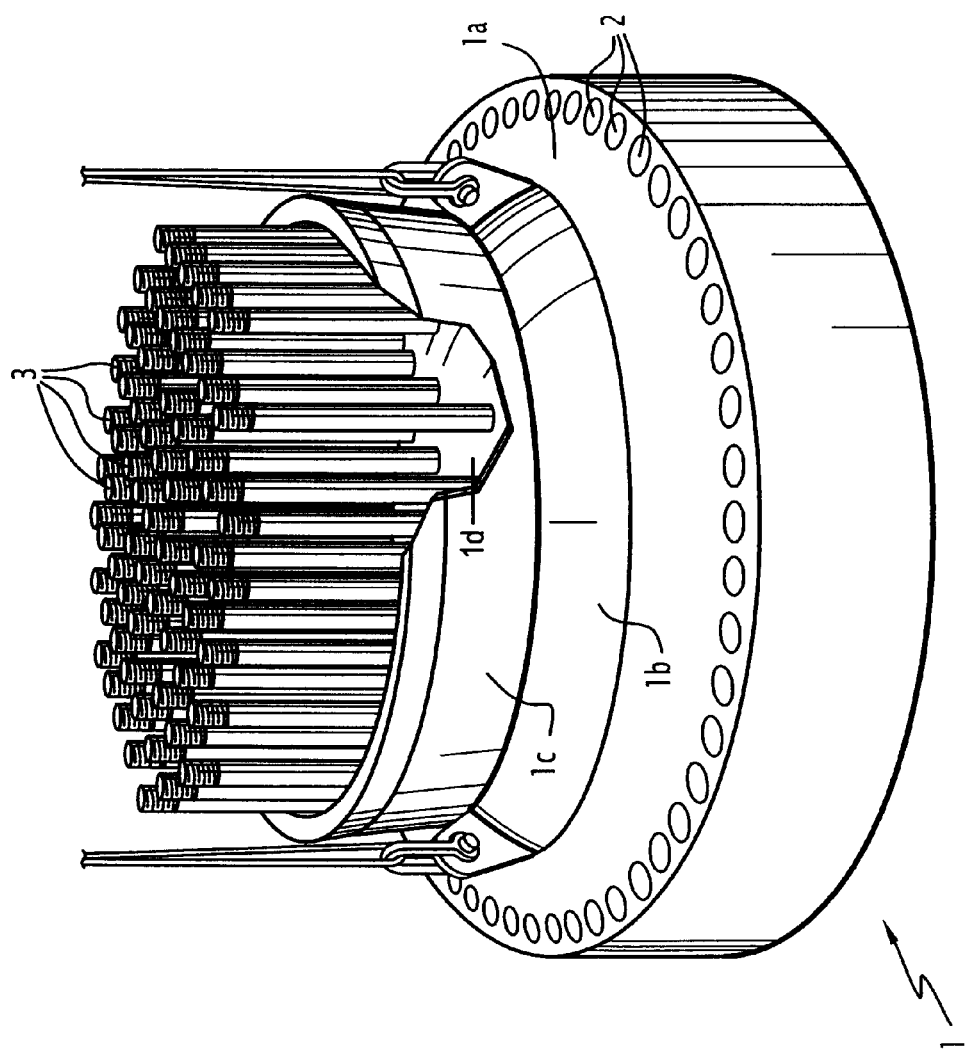
FIG. 1 is a perspective view of a vessel head of a pressurized water nuclear reactor in the cap position.

FIG. 1 shows a pressurized water nuclear reactor vessel head given overall reference 1.

The vessel head has an annular flange 1a of very great thickness for fitting onto a flange constituting the top portion of the vessel. The flange 1a is pierced by openings 2 for passing studs for securing the vessel head on the vessel flange.

The central portion 1b of the vessel head is in the form of a spherical cap and is pierced by openings for securing a plurality of adapters 3 that are disposed so that their axes are parallel to the axis of symmetry of the vessel head. In FIG. 1, the vessel head 1 is shown placed in a "cap" position, the head resting on horizontal ground via its flange 1a, and with the spherical cap constituting the central portion 1b of the vessel head having its convex rounded portion directed upwards. In this disposition, the axis of the vessel head and the axes of the adapters 3 are all vertical. Around the set of adapters (the head shown has 65 adapters) there is disposed a cylindrical connector 1c secured to the vessel head and enabling a cylindrical protective casing (not shown) to be placed around the adapters.

As can be seen in FIG. 1, the adapters are distributed over the surface of the spherical cap 1d constituting the central portion of the vessel head in rectilinear rows and in annular rows around the axis of the vessel. As a result, apart from a central adapter, the adapters have vertical axes that do not intersect the axis of the vessel passing through the center of the spherical surface of the cap 1b.

Figure 2:
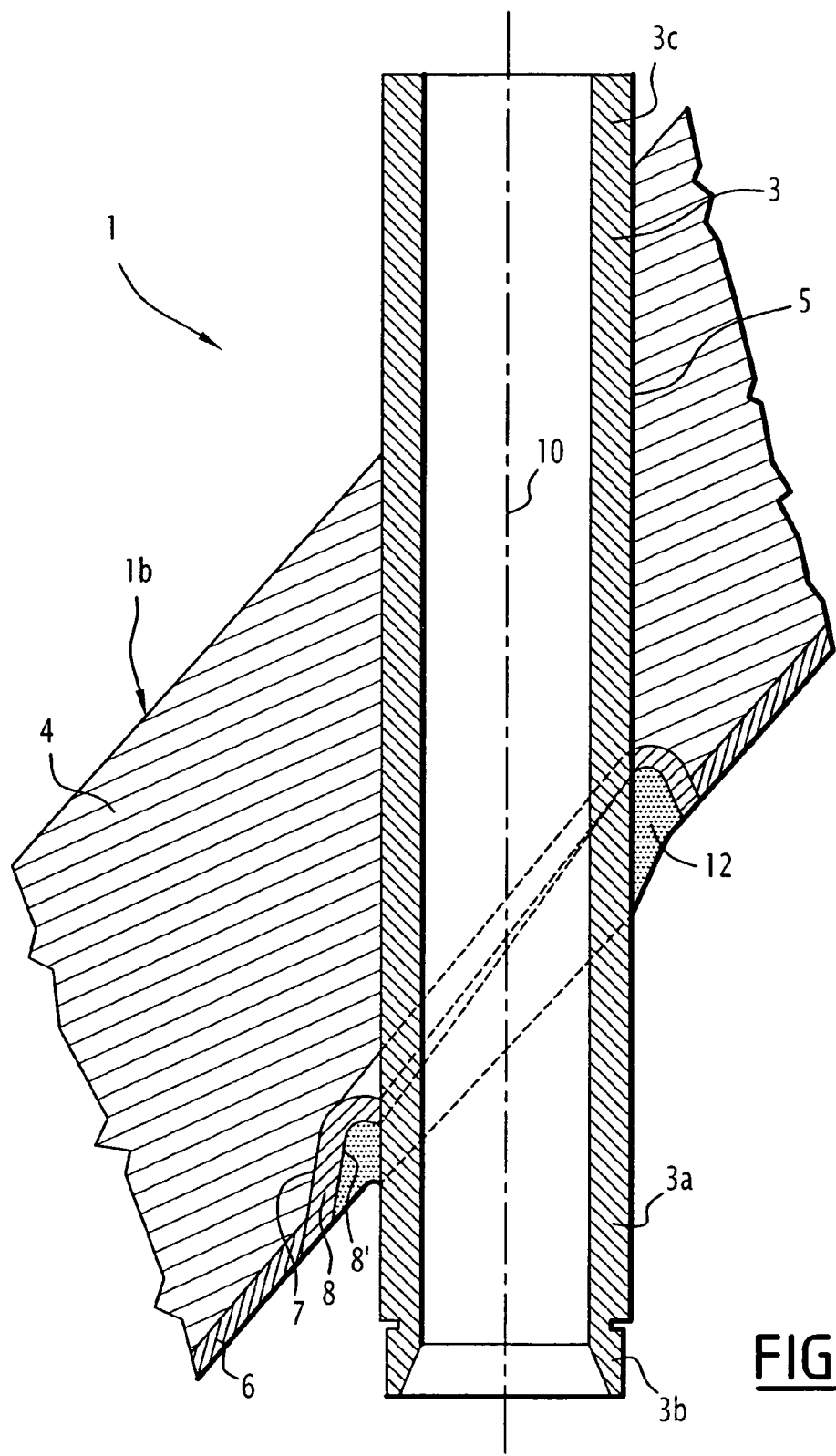
FIG. 2 is a section view showing a bottom portion for securing an adapter to the vessel head.

FIG. 2 is a section on a vertical plane showing a zone of the thick wall 4 of a vessel head in its portion 1b that is in the form of a spherical cap. The portion shown of the wall 4 corresponds to a zone for securing an adapter 3. In the zone for securing the adapter 3, the wall 4 of the spherical-cap shape vessel head (shown in the cap position) is pierced by an opening 5 in which the adapter tube 3 is engaged and secured. The wall 4 of the low-alloy ferritic steel vessel head is internally covered in a coating layer of stainless steel 6.

After the wall 4 of the head has been forged and machined, a layer of stainless steel (24% chromium and 12% nickel, or 20% chromium and 10% nickel) is deposited on the concave inside surface of the vessel head using a submerged arc welding method employing a machine fed with stainless steel strip.

After making the stainless steel layer over the entire inside surface of the wall 4 of the vessel head, an annular facing 7 is made in each of the zones for securing an adapter 3 to the inside surface of the head, with the section of the facing being asymmetrical, as shown in FIG. 2. Thereafter, a buttering layer 8 of nickel alloy (such as 152 alloy when securing an adapter 3 made of nickel 690 alloy) is deposited inside each of the annularly-shaped facings 7.

Figure 3:
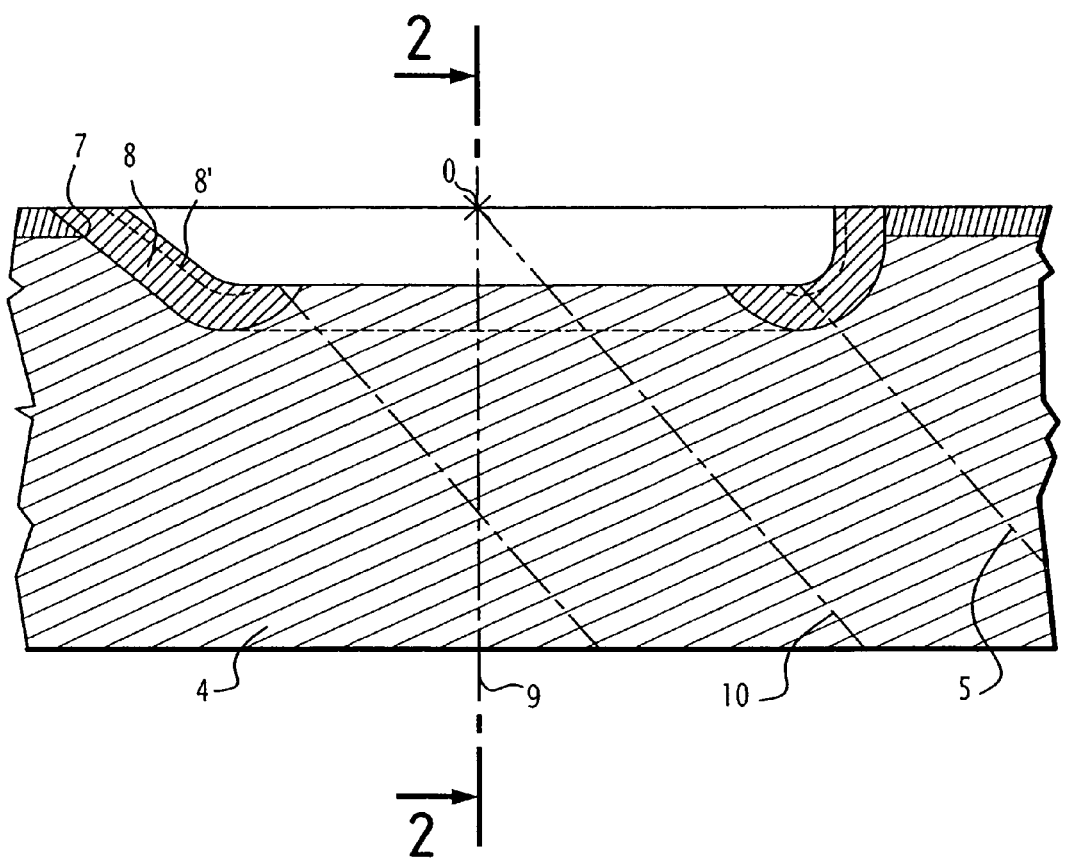
FIG. 3 is a section view of a portion of the vessel wall in the bowl position in a zone for securing an adapter tube, after a first welding material has been deposited and before the spherical wall has been filled.

FIG. 3 shows a zone of the vessel head wall 4 in which an annular facing 7 has been machined around a zone where a bore 5 will subsequently be made for passing an adapter tube 3. In FIG. 3, the vessel head wall 4 is shown in a bowl position, i.e. in a position in which the concave portion of the vessel head is upwardly directed. In conventional manner, in FIG. 3, the wall 4 is shown as being practically plane in shape in the zone where an adapter passes through, which zone extends over a short distance in the circumferential direction of the inside surface of the wall 4. In addition, FIG. 3 shows the axis 10 on which the bore 5 is to be drilled and the radial direction 9 of the wall 4 that intersects the axis 10 of the bore 5 at a central point 0 in the zone for passing the adapter. In conventional manner, and to clarify the drawing, the radial direction 9 of the wall 4 is shown as being vertical.

The bore 5 for passing an adapter as shown in FIG. 3 lies in a zone of the spherical wall 4 such that the angle between the axis 10 of the bore 5 and the radial direction 9 is a little greater than 38°.

After the asymmetrical annular facing 7 has been made by machining around the radial direction 9 with the profile that is shown in FIG. 3, a buttering layer 8 is made by depositing a first welding material, e.g. of Inconel 150 alloy, which is then machined again by milling in order to obtain the inside surface 8' of the buttering layer 8 in the finished state.

Thereafter, by drilling along the axial direction 10, the bore 5 is made through the wall 4.

As can be seen in FIG. 2, an adapter 3 is engaged and secured tightly in the bore 5. To do this, a bore 5 is provided having a diameter that is slightly smaller than the outside diameter of the adapter 3, and the adapter 3 is mounted using liquid nitrogen, i.e. by engaging the adapter 3 in its mounted position as shown inside the bore 5 and as shown in FIG. 2 after cooling the bottom portion of the adapter 3 to the temperature of liquid nitrogen. When the adapter 3 returns to the temperature of the wall 4 (generally a temperature of about 20° C.), the expansion of the adapter tube ensures that it is mounted tightly in a well-determined position inside the bore 5. The bottom portion 3a of the adapter 3 carrying a thread 3b for mounting a control rod engagement cone then projects a little beneath the bottom surface of the vessel head (shown in the cap position in FIG. 2). The top portion 3c of the adapter projects above the convex top surface of the wall 3 and is shown in part only.

Thereafter, the adapter 3 is welded to the vessel head by depositing welding material 12 in the remaining portion of the facing 7 that remains after the buttering layer 8 has been deposited and machined, so as to provide metallurgical bonding between the adapter 3 of nickel alloy and the buttering layer 8 which is also of nickel alloy. The second welding material 12 is generally constituted by the same nickel alloy as the buttering layer 8.

In the invention, at least one of the operations of buttering by depositing a layer 8 of a first welding material, and of welding the adapter 3 by depositing a second welding material, can be performed in a manner that is entirely automatic.

Figure 4:
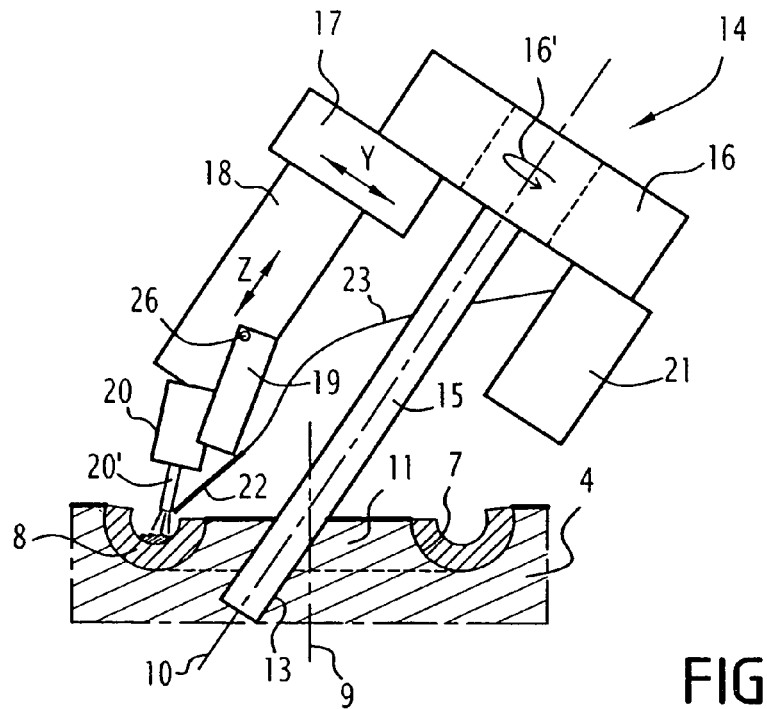
FIG. 4 is a diagrammatic view of a welding device for prior deposit of a first welding material in a facing for securing an adapter tube by the automatic method of the invention.

FIG. 4 shows an automatic welding device that can be used for implementing the method of the invention for automatically depositing welding material.

As with FIG. 3, the wall 4 of the vessel head is shown in an adapter-securing zone in a bowl position and with a radial direction of the wall 4 extending vertically.

After the inside of the wall 4 of the vessel head has been coated in a layer of stainless steel, an annular facing 7 is machined around the zone through which the adapter is to pass.

The annular facing 7 is machined in such a manner as to conserve a reserve of metal 11 in the central portion of the facing 7. Compared with prior methods in which the buttering is performed manually, in order to perform this operation automatically and as shown in FIG. 4, a facing 7 of reduced and accurately constant thickness is machined all around the periphery of the facing, with said thickness being equal to a multiple of the width of a weld bead deposited automatically. This makes it unnecessary to deposit partial weld beads in order to make up the buttering layer.

Thereafter, the central portion of the reserve of metal 11 is drilled in the direction 10 of the theoretical geometrical axis for the bore in which the adapter is to be secured after the buttering layer 8 has been made and the wall 4 of the head has been drilled. For example, for an adapter as shown in FIG. 2, the axis 10 is at an angle of slightly more than 38° relative to the direction 9 that is normal or radial relative to the wall 4. The automatic welding device used for making the buttering layer 8 and given overall reference 14 has a shaft 15 which is engaged and secured inside an opening 13 of axial direction 10 that is prepared beforehand by drilling into the reserve of metal 11 in the central portion of the annular facing 7. A rotary head 16 is mounted on the shaft 15 and has means 28 for driving it in rotation about the axis 10 of the shaft 15, as represented by curved arrow 16'. The rotary head 16 carries firstly an automatic welding torch 20 via a radially-displaceable first motor-driven carriage 17, an axially-displaceable second motor-driven carriage 18, and a motor-driven torch tilting device 19, and secondly a reel of welding wire 21 for feeding a wire guide 22 pointing towards the electrode 20' of the welding torch 20. The electrode 20' of the welding torch 20 is electrically powered for welding so that an arc forms between the end of the electrode 20' and the bottom of the facing 7. The welding wire 23 fed to the wire guide 22 by the coil which is fitted with a motor-driven unreeling device 27 is melted by the arc so as to deposit a weld bead in the bottom of the facing 7.

The welding wire 23 is preferably a coated wire with its metal portion being made of a nickel alloy, e.g. alloy 152.

In order to perform welding automatically, the welding head 16 is set into rotation as represented by arrow 16' by its own drive means 28. In order to make a weld bead in a portion of the facing 7, the position of the position torch 20 is initially adjusted along the Y direction perpendicular to the axis of rotation of the head 16 by means of the carriage 17. Thereafter, the carriage 17 remains stationary, and while the head 16 is rotating, an elliptical weld bead is deposited in the bottom of the facing by moving the welding torch 20 in controlled manner in the axial direction Z parallel to the axis 10 by means of the axial displacement carriage 18.

In order to ensure that the electrode 20' remains in an accurately constant position relative to the surface on which the welding material is being deposited, the inclination of the torch 20 about an axis orthogonal to the theoretical axis of the bore and perpendicular to the plane containing the axes Y and Z is adjusted by means of the torch tilt device 19. This ensures that the distance between the end of the electrode 20' and the deposition surface, and the angle of tilt of the electrode 20' of the torch relative to the direction of the theoretical axis of the bore are adjusted to values that remain accurately constant. The weld wire 23 which is fed in regulated manner into the arc produced by the melting electrode 20' thus serves to deposit a weld bead of constant characteristics.

Throughout the rotation of the welding head 16, the displacement of the carriage in the axial direction Z and the angle of inclination of the torch 20, and also the welding current and the linear feed rate of the weld wire 23 are controlled in programmed manner by a control unit 30 of the automatic welding device 14 so as to produce a weld bead having characteristics that are accurately constant. In particular, the welding current and the feed rate of the weld wire are adapted during rotation of the welding head in order to obtain buttering that is regular.

As described above, after the layer of buttering 8 has been deposited in the annular facing 7, the layer of buttering that has been deposited is machined by being milled so as to obtain a layer 8 having a finished state, after which the bore 5 is drilled in the previously-defined axial direction 10 through the reserve of metal 8 in the central portion of the wall 4 left in position after making the facing 7. The adapter tube 3 is then engaged and secured tightly, as shown in FIG. 5 (vessel head in the bowl position).

Figure 5:
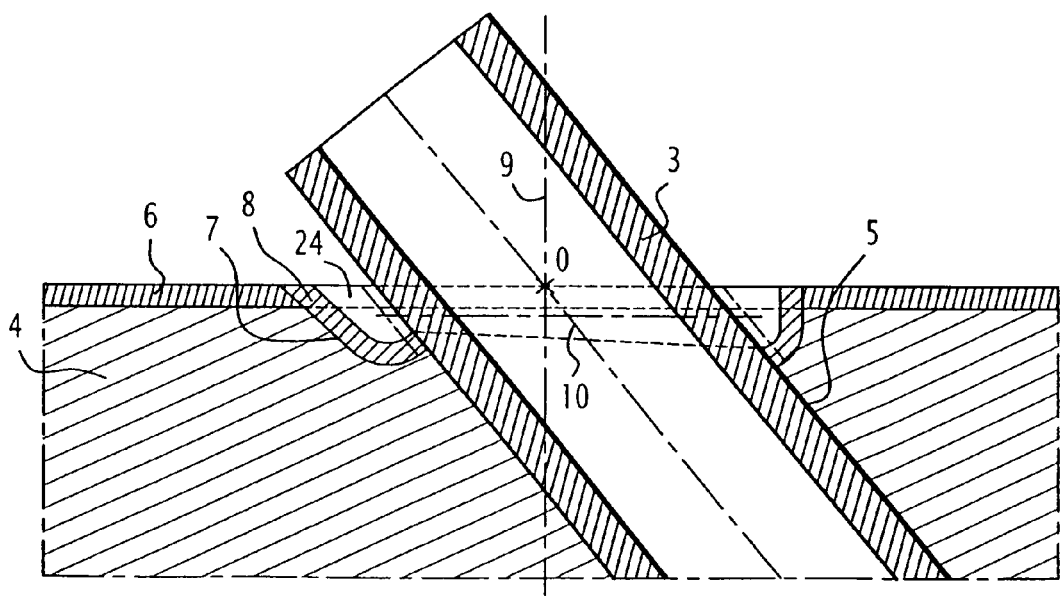
FIG. 5 is a section view of a portion of the wall of a hemispherical head after an adapter tube has been put into place in a bore passing through the wall.
Figure 6:
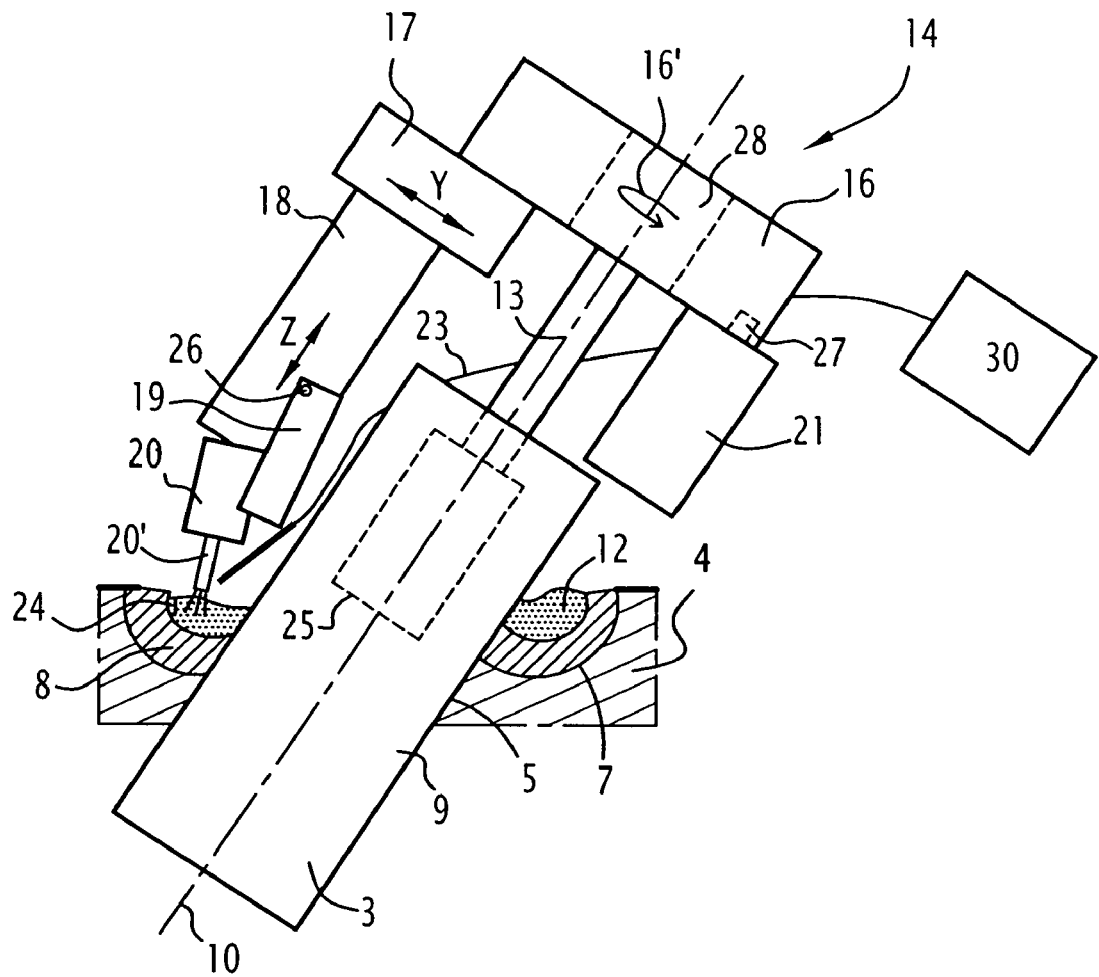
FIG. 6 is a diagrammatic view of an automatic welding device for implementing the method of the invention while welding an adapter.

As can be seen in FIG. 5, the layer of buttering 8 covers the bottom of the facing 7 machined in the ferritic steel wall 4 and the layer 6 of stainless steel. The welding of the adapter takes place in uniform manner between two nickel alloys by filling a weld preparation chamfer 24 defined between the nickel alloy wall of the adapter 3 and the layer of buttering 8 with a nickel alloy that is compatible with the alloy constituting the adapter 3. The chamfer 24 can be filled with a welding material that is constituted, for example, by a nickel 152 alloy analogous to the nickel alloy of the buttering layer 8. In the invention, welding can be performed manually after buttering has been performed automatically in the manner described above. Nevertheless, it is preferable, as shown in FIG. 6, for the adapter 3 to be welded to the wall 4 of the vessel head by using the automatic welding device 14 as described with reference to FIG. 4, or by using an analogous device. The automatic welding device 14 used for welding the adapter 3 and shown in FIG. 6 comprises, in addition to the components described above, means 25 for centering and securing the shaft 13 inside the bore of the adapter 3 on the axis of the adapter, the shaft 13 then being held on the axis 10 of the bore 5 and of the adapter 3.

The operation of the automatic welding device 14 for making weld beads in the chamfer 24 is analogous to the operation of the welding device for making a buttering layer as described above. The chamfer 24 is filled with the welding material 12 constituted by juxtaposed welding beads having accurately constant characteristics. Between two welding passes, for the purpose of depositing two successive beads all along the circumference of the chamfer 24, the welding torch is displaced in the Y direction perpendicular to the axis 10 by a determined amount corresponding to the width of a welding bead by means of the motor-driven carriage 17. As before, the axial displacement carriage 18 and the device 19 for adjusting the angle of inclination of the torch are programmed and adjusted throughout the time welding is taking place. The same applies to the welding current and to the wire feed rate of the automatic welding machine. The control unit 30 enables the displacements of the welding torch to be controlled by the motor-driven carriages 17 and 18 and the tilting device 19 and enables welding conditions to be adjusted in programmed manner (welding current and feed rate of the welding material).

This enables buttering and welding for securing an adapter to be performed in automatic manner with quality that is accurately constant and with increased execution speed.

The method of the invention for securing an adapter can be implemented by performing automatically in the manner described above both the preliminary buttering of the facing and the welding of the adapter, or else by performing only one of those two buttering and welding operations in automatic manner, as described.

The buttering could optionally be performed manually or automatically by using a method other than that described above. In particular, the buttering could be performed by an automatic method as described in a patent application filed on the same day as the present application, in which the welding material is deposited by causing the welding torch to turn about an axis extending radially relative to the spherical surface of the vessel head.

In order to implement the method of the invention, it is also possible to perform buttering in automatic manner as described above, by causing the welding head to turn about an axis that is inclined relative to the radial direction of the spherical surface of the vessel head and to perform automatic welding in a manner that is different, or even to perform welding manually.

Under all circumstances, performing at least one of the buttering and welding operations in automatic manner makes it possible to reduce significantly the time required for executing the operations of securing the adapter and obtaining a bond of very good metallurgical quality.

The invention is not limited to securing adapters for passing through the vessel head, but can also be used for securing any cylindrical tubular element that passes through a spherical wall.

The invention may be applied outside the field of building or repairing nuclear reactors.

What is claimed is:

1. A method of securing a tube of substantially cylindrical shape in a bore passing through a spherical wall along an axial direction, the method comprising the steps of:

machining an annular facing in an inside surface of the spherical wall at the periphery of a zone of the spherical wall through which the bore for securing the tube subsequently passes;

depositing a buttering first welding material in the facing;

machining the first welding material;

making the bore by drilling through a portion of the spherical wall surrounded by the facing;

engaging the tube tightly in the bore;

depositing a second welding material in the facing at the periphery of the tube in order to weld the tube to the first welding material previously deposited in the facing, at least one of the operations of depositing the first and second welding materials in the facing is sequentially performed automatically by the steps:

moving the welding head through a predetermined fixed distance in a direction perpendicular to the axis of the bore to correctly position an electrode of an automatic welding torch relative to the facing;

and simultaneously:

(a) causing the automatic welding torch to rotate about an axis of the bore for securing the tube therein;

(b) moving the automatic welding torch in a direction parallel to the axis of the bore to correctly position the electrode relative to the facing;

(c) causing the automatic welding torch to pivot about an axis orthogonal to the axis of the bore while the welding torch is being turned, so as to deposit the welding material in the facing in the form of a weld bead having characteristics that are constant;

(d) continuously feeding welding material to the torch electrode for melting the welding material, (e) automatically controlling the movement in (a), (b), and (c);

(f) automatically controlling the rate of feeding welding material; and (g) automatically controlling current flow to the torch electrode;

the simultaneous movement and control of (a)-(g) resulting in consistent deposited welding material beads;

wherein at least one of the first and second welding materials is deposited automatically by successive passes by repeating the automatic sequential steps above to deposit successive weld beads extending all around the periphery of the annular facing and juxtaposed in a direction perpendicular to the axis of the bore for securing the tube.

2. A method according to claim 1, together with the steps of: making the annular facing by machining, leaving a reserve of metal of the spherical wall inside the annular facing; drilling an opening in the reserve of metal inside the facing along the axis of the bore for securing the tube; securing a shaft in an opening on the axis of the bore; mounting a rotary welding head of an automatic welding installation on the shaft in order to set it into rotation about the axis of the bore; and automatically depositing a first welding material in the annular facing by setting the welding head of the automatic welding device into rotation about the axis of the bore on the shaft.

3. A method according to claim 1, wherein, after the tube has been tightly engaged in the bore passing through the spherical wall, a shaft of an automatic welding device having a welding head mounted rotatably on the shaft is secured inside the tube on the axis of the tube, and the tube is welded automatically to the spherical wall by causing the welding head to turn about the axis on the shaft that is secured in the tube.

4. A method according to claim 1, wherein, in order to deposit at least one of the first and second welding materials automatically in the facing, the current fed to the welding torch and the feed rate of a welding material to the welding torch are controlled while the welding torch is rotating about the axis of the bore.

* * * * *